March 17, 1942.    C. RIPARBELLI ET AL    2,276,702
TRANSMISSION MECHANISM WITH AUTOMATICALLY VARIABLE RATIO
Filed Feb. 24, 1939
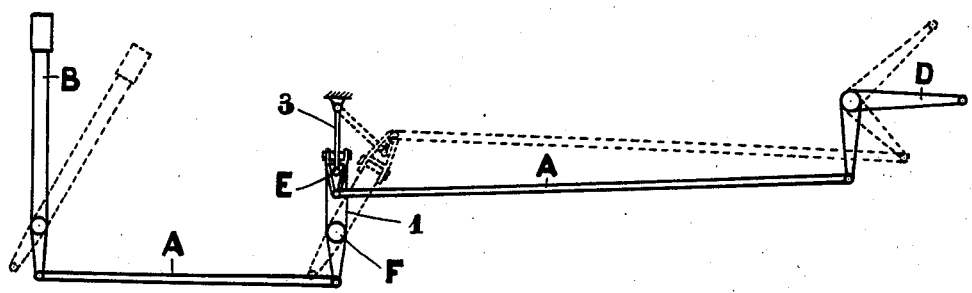
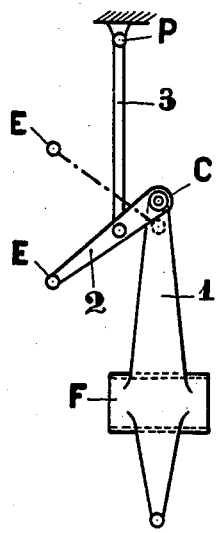
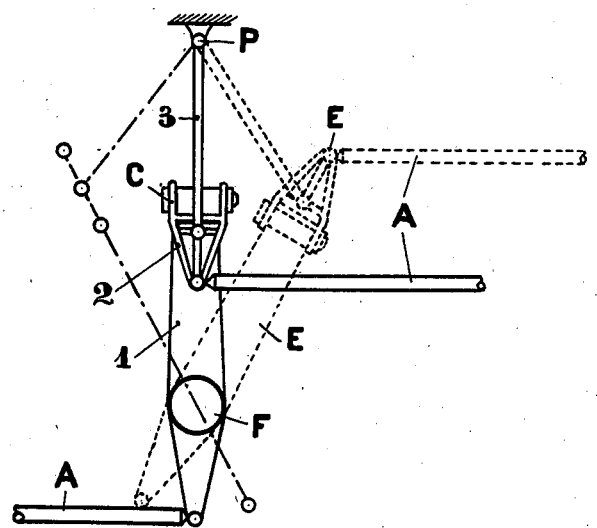
Inventors.
Carlo Riparbelli,
Nicola De Martino.
BY Haseltine Lake & Co.
ATTORNEYS Patented Mar. 17, 1942

2,276,702

UNITED STATES PATENT OFFICE 2,276,702

TRANSMISSION MECHANISM WITH AUTOMATICALLY VARIABLE RATIO

Carlo Riparbelli and Nicola De Martino, Rome, Italy

Application February 24, 1939, Serial No. 258,208
In Italy March 22, 1938

2 Claims. (Cl. 74—516)

The transmission ratio of control mechanisms in vehicles designed to move in a fluid and specially in aircrafts, is determined in relation to the moveable surfaces controlled and to the velocity of the vehicle with respect to the fluid in which it is moving.

It is necessary in fact that to a limited stroke of the hand or of the foot, there is a corresponding angle of the moveable surface, a rudder or a flap, such as to produce the necessary lift required for the aircraft to accomplish the manoeuvre more particularly, in the case of an aeroplane, where all lifting surfaces are exposed to the wind, the lift, on equal angles of incidence, is practically proportional to the square of the velocity relatively to the wind, and from this it follows that a suitably proportioned rate of transmission for a given velocity causes insufficient controls with lower velocities, and too scarce sensitivity and hard controls at greater velocities.

In order to prevent this serious inconvenience, various systems have been designed with the object of allowing the pilot to alter the rates of transmission of the controls, so that to a given displacement of the control element operated with the hand or with the foot of the pilot, there is a corresponding angle of the control surface, adjustable as desired by the pilot. This may be obtained, for example, by acting on a screw, by rotating round its own axis the control rod, or by other similar means.

In said systems, the pilot regulates the rate of transmission in relation with the velocity that he intends to maintain.

These systems have however the serious inconvenience that they cannot be used in the case of rapid variations of speed, and moreover generally, if an arm length variator of this type is applied to the flap control bar, it cannot be applied independently for the balancer, moreover the ratio between the rudder bar and the rudder may not be changed easily.

The present invention relates to a mechanism to be applied to any desired control, and operating so that to small displacements of the hand or of the foot correspond a small angle of the control surface, and to a great displacement thereof there is a corresponding angle of said surface which is greater than that which would correspond to the linear ratio of transmission. This latter is substantially such that the relation between the angle $\alpha$ of the control surface, depending from the displacement $\delta$ of the hand or the foot of the pilot, must not be: $\delta = K\alpha$, as is usually the case, but, by way of example, is: $\alpha = K\delta^n$ in which $n > 1$, and $K$ is a constant.

In such a case the pilot is enabled to find automatically, at each operation, the angle which allows him to accomplish the control intensity desired. At high velocities, he will displace the control to a small but noticeable amount, thus causing the control surface to rotate through a very small angle, which is however sufficient owing to the high velocity.

With slow velocities, the pilot will displace the control to a greater extent, such greater displacement being limited by the conditions of space of the control, the control surface will rotate through a much greater angle thus producing the required aerodynamical action.

The mechanism according to the present invention which allows of a rate of transmission changing automatically as desired, i. e., varying without the intervention of the pilot, may be applied to any control, by interposing it at any point of the transmission.

The annexed drawing illustrates by way of example, the application of the device to the various controls of an aircraft, Fig. 1 shows the device applied to an elevator controlled by the bar.

Figures 2 and 3 show respectively the device viewed perpendicularly with respect to the axis of the pivot, and parallel to the axis of the pivot.

In the example illustrated, the transmission comprises a rod A which, through a train of levers, connects the bar B to the horizontal moveable plane D.

The mechanism consists of a lever 1, one arm of which carries an appendix connected thereto by a hinge C in such a way that the corresponding end of lever 1 may be brought towards or away from the fulcrum F.

The hinge C is disposed with its axis substantially at a right angle to (or anyhow not parallel to) the axis of the fulcrum F of the lever, so that the end with a variable arm, although it may vary its distance from the fulcrum, is forced to follow the movement of rotation of the lever round the fulcrum F.

The variable arm lever 1 (Figs. 1 and 2) is shown in full lines in the position of rest, and in broken lines in its extreme position. Said lever 1 is provided with only one degree of freedom (rotation round the fulcrum F) and is connected by means of a pivot C to an appendix 2. The appendix 2 is connected to the aircraft in an intermediate point P by means of a rod 3 provided at its ends with Cardan joints. The point P is disposed to the opposite side of the fulcrum F with respect to lever 1.

Rod 3 has a length such that the position of rest of the control corresponds to that in which the end E of the appendix 2 is nearest to fulcrum F, and during the control stroke, the rod 3 causes the appendix 2 to go further off said fulcrum F, so that in the maximum stroke the end of appendix 2 is further off from fulcrum F than is the case in the position of rest.

In other words, the actual length of the lever arm, which is that corresponding to the distance between the fulcrum F, and the free end E of appendix 2, on which the transmission of the control is pivoted, increases as the amplitude of the control stroke increases.

This system of levers determines a nonlinear ratio of movement between the stroke of the control rod leading to the mechanism and the rod departing therefrom, such ratio increasing with the increase of the stroke of the control rod.

The control-transmission device above described by way of example with reference to the accompanying drawing, may be varied by arranging differently the levers and the arms, so as to obtain likewise an increasing ratio of movement between the control elements and those controlled, which is the fundamental principle of the invention.

We claim:

1. Mechanism adapted to transmit in either of two directions the movement from a control element to a controlled element at an increased ratio of transmission between said two elements so as to increase the stroke of the controlled element, in either of said directions, said mechanism comprising a rod, a first class lever having one arm connected by means of said rod to the control element, the other arm being provided with a pivot on which an appendix is pivoted on an axis substantially at a right angle to the axis of the fulcrum of said lever, attached by a Cardan joint by means of a rod to a point fixed with respect to said fulcrum, so that when said lever rotates round its fulcrum in either direction, the free end of said appendix moves increasingly away from the end of said other arm of the lever connected to the control element.

2. Mechanism adapted to transmit in either of two directions, the movement from a control element to a controlled element at a modified rate of transmission between said two elements so as to change the stroke of the controlled element in either of said directions, said mechanism comprising a rod, a first class lever having one arm connected by means of said rod to the control element and the other arm having a pivot and an appendix pivoted on said pivot on an axis disposed substantially at a right angle to the axis of the fulcrum of said lever, a rod, said appendix being attached by a Cardan joint by means of said rod to a point fixed with respect to said fulcrum, so that when said lever rotates round its fulcrum in either direction, the free end of said appendix moves increasingly away from the end of the other arm of the lever which is connected to the control element.

CARLO RIPARBELLI.
NICOLA DE MARTINO.